Patented June 5, 1951

2,555,354

UNITED STATES PATENT OFFICE 2,555,354

1-ALIPHATIC-3,3 - DIPHENYL-2-PYRROLI-DONES AND PROCESS FOR PREPARING SAME AND RELATED PRODUCTS

Philip Lucas, Middlesex County, Mass., and Robert L. Clarke, Albany County, and Aram Mooradian, Rensselaer County, N. Y., assignors to Sterling Drug, Inc., New York, N. Y., a corporation of Delaware No Drawing. Original application January 14, 1949, Serial No. 71,042. Divided and this application January 15, 1949, Serial No. 71,213

18 Claims. (Cl. 260—326.5)

This invention relates to a new process for preparing 2-pyrrolidones substituted by an aliphatic group in the 1-position. It also embodies a new class of 2-pyrrolidones which are useful as therapeutic agents and can be used as intermediates for the synthesis of compounds which possess physiological activity.

Our new process comprises reacting with the chloride of a strong acid a carboxylic acid linked at the gamma position thereof to the ring nitrogen atom of a saturated nitrogen-heteromonocyclic group, and heating the resulting tertiary-amino carboxylic acid chloride whereby a 2-pyrrolidone is formed. A preferred embodiment is illustrated thus: in the carboxylic acid of Formula I, Y is a divalent hydrocarbon radical in which three carbon atoms intervene between the carboxyl group and the nitrogen atom, and X is a divalent bridge, preferably chosen from among $-CH_2-$, $-CH_2CH_2-$, and $-CH_2O-$. We have found that when an acid of this type is treated with an excess of a reagent of the type commonly used to prepare acid chlorides and heated at the boiling temperature of said reagent, the acid chloride (Ia) is transformed into a 2-pyrrolidone (II).

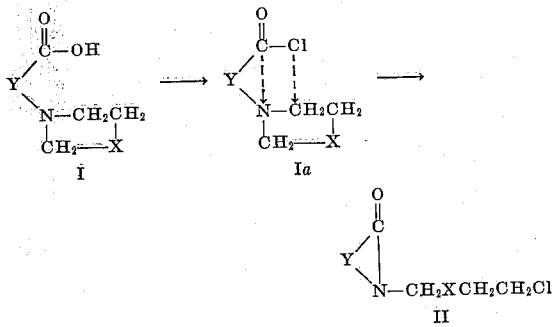

The heterocyclic ring of the acid (I) is preferably symmetrical in nature and X is defined in such a way that this will be the case. The heterocycles thus encompassed include piperidine, pyrrolidone and morpholine.

The acid chlorides are formed by treatment of the corresponding carboxylic acid with the chloride of a strong acid, i. e., an acid having a dissociation constant of at least about $10^{-3}$. Such chlorides of strong acids include thionyl chloride, phosphorus trichloride, phosphorus pentachloride and oxalyl chloride. Formation of the acid chloride takes place at room temperature or slightly above and is driven to completion by heating. In preparing the 2-pyrrolidones, the acid chloride need not be isolated since the rearrangement reaction takes place at or below the reflux temperature (70–80° C.) of the acid chloride forming reagent. Therefore, the overall reaction can be carried out simply by mixing the carboxylic acid with the acid chloride forming reagent (preferably thionyl chloride or phosphorus trichloride) and gradually heating the mixture to a condition of reflux. Refluxing for one or two hours completes the reaction.

Our new process affords a way of preparing a new class of compounds useful as pharmaceuticals, and as intermediates for the preparation of other useful compounds. This new class of compounds has the general structure

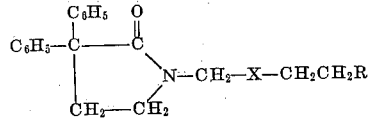

wherein, as before, X is a divalent bridge, chosen from the following; $-CH_2-$, $-CH_2CH_2-$, and $-CH_2O-$; and R is chlorine or tertiary-amino. In other words, they are 3,3-diphenyl-2-pyrrolidones substituted in the 1-position by an aliphatic group of the particular type depicted.

The necessary intermediates are prepared as follows. Diphenylacetonitrile is alkylated, in the presence of a strong base such as sodium amide, with the appropriate beta-(N-heteryl)-ethyl halide to give a 2,2-diphenyl-4-(N-heteryl)-butanenitrile:

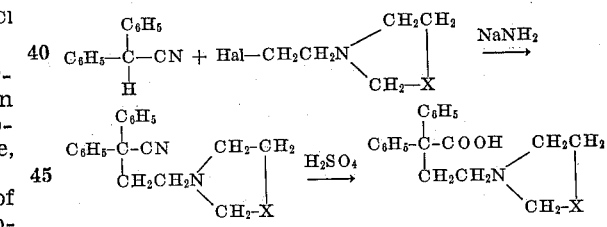

The halides which may be used include beta-(N - piperidyl) - ethyl, beta - (N - morpholinyl)-ethyl and beta-(N-pyrrolidyl)-ethyl halides.

The 2,2-diphenyl-4-(N-heteryl)-butanenitrile is then hydrolyzed by the action of approximately 70% aqueous sulfuric acid to the corresponding butanoic acid.

This acid is converted to the desired 2-pyrrolidone where R is chlorine by employing our new process just described. Reaction between the 2,2-diphenyl-4-(N-heteryl)-butanoic acid and an acid chloride forming reagent (preferably thionyl chloride or phosphorus trichloride) starts at about 30° C. with facile formation of the acid chloride. When the initial vigorous reaction has slowed down, heating of the reaction mixture to the reflux temperature of the reagent, which is present in excess, completes the formation of the acid chloride and initiates the rearrangement to the 2-pyrrolidone, which rearrangement is complete in a few hours.

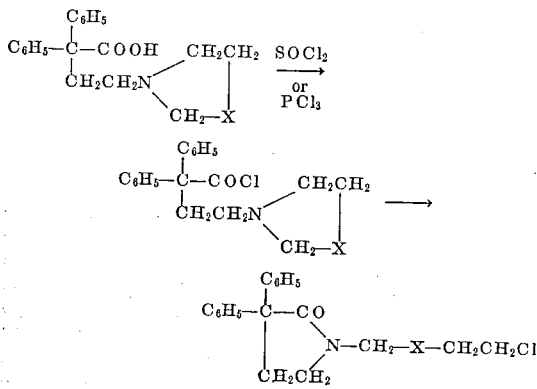

The N-chloroaliphatic-3,3-diphenyl-2-pyrrolidones thus formed are readily converted to the corresponding tertiary-aminoaliphatic derivatives by heating the chloro compound with a secondary amine, preferably a dialkylamine or a saturated heterocyclic amine, in a bomb or a sealed tube at 100° C., preferably in the presence of an inert solvent such as benzene. A closed system is necessary when a lower dialkylamine is used, because of the high volatility of the latter. Examples of amines that may be used are dimethylamine, ethylmethylamine, diethylamine, ethylpropylamine, dipropylamine, dibutylamine, diamylamine, piperidine, pyrrolidine, morpholine, etc. For instance, the secondary amines just named, when condensed with 1-(5'-chloropentyl)-3,3-diphenyl-2-pyrrolidone give respectively the following compounds: 1-(5'-dimethylaminopentyl)-; 1-(5'-ethylmethylaminopentyl)-; 1-(5'-diethylaminopentyl)-; 1-(5'-ethylpropylaminopentyl)-; 1-(5'-dipropylaminopentyl)-; 1-(5'-dibutylaminopentyl)-; 1-(5'-diamylaminopentyl)-; 1-[5'-(N-piperidyl)-pentyl]-; 1-[5'-(N-pyrrolidyl)-pentyl]-; and 1-[5'-(N-morpholinyl)-pentyl]-3,3-diphenyl-2-pyrrolidone.

The tertiary-aminoaliphatic-3,3-diphenyl-2-pyrrolidones are basic and therefore can be converted readily to quaternary ammonium salts or to salts derived from addition of acids. Acid addition salts can be made by reaction of the free base with mineral acids such as hydrochloric acid, hydrobromic and, hydriodic acid and sulfuric acid; and organic acids such as acetic acid, citric acid and tartaric acid. Readily obtainable quaternary ammonium salts are those derived from lower alkyl and aralkyl esters of strong inorganic acids and organic sulfonic acids, such as methyl chloride, methyl bromide, methyl iodide, ethyl chloride, ethyl bromide, ethyl iodide, propyl bromide, propyl iodide, benzyl chloride, benzyl bromide, methyl sulfate, methyl benzene sulfonate, methyl p-toluenesulfonate, etc.

The following examples will illustrate our invention more fully but should not be construed as a limitation thereto.

*Example 1*

(a) 2,2-diphenyl-4-(N-piperidyl)-butanoic acid

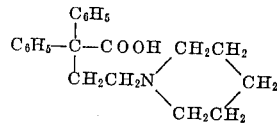

To a cold solution of 200 ml. of concentrated sulfuric acid in 135 ml. of water (70% sulfuric acid by weight) was added 120 g. of 2,2-diphenyl-4-(N-piperidyl)-butanenitrile (Bockmuhl and Ehrhart, U. S. Pat. 2,230,774), M. P. 73–74° C. The resulting solution was heated at 145° C. (gentle reflux) for 65 hours, cooled, and poured over cracked ice. The mixture was made strongly alkaline with 35% sodium hydroxide. The sodium salt of the amino acid separated partially at this point due to salting-out effects and was filtered off. The filtrate was adjusted to a pH of 7 with hydrochloric acid and the free amino acid which separated was filtered off, washed with water and dried. The sodium salt, separated above, was dissolved in a minimum amount of water and the pH adjusted to 7. The precipitated amino acid was filtered off, washed with water and dried. The total amount of slightly impure 2,2-diphenyl-4-(N-piperidyl)-butanoic acid isolated thus was 83 g. or 60% of theory, M. P. 227–230° C.

Anal.—Nitrogen: Calcd., 4.33. Found, 4.04.

(b) 1-(5'-chloropentyl)-3,3-diphenyl-2-pyrrolidone

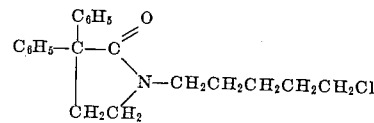

To 325 ml. of thionyl chloride cooled to 5–10° C. was added gradually with vigorous stirring 122 g. of 2,2-diphenyl-4-(N-piperidyl)-butanoic acid. As the mixture was gradually and carefully heated to a reflux temperature acid chloride formation occurred. After refluxing for three hours, the excess thionyl chloride was removed at reduced pressure and water was added to the residue. The product was extracted with ether, the ether solution washed with water and dried over anhydrous potassium carbonate. After evaporation of the ether, the product was fractionated twice at reduced pressure and the fraction boiling at 181–199° C. (0.31 micron) was collected ($n_D^{25}$=1.5770–1.5802), amounting to 55 g. (48%). When cooled, this oil crystallized. It was recrystallized twice from petroleum ether (B. P. 60–70° C.) giving pure 1-(5'-chloropentyl)-3,3-diphenyl-2-pyrrolidone, M. P. 58–59° C. $n_D^{25}$ (supercooled liquid) =1.5760.

Anal.—Calcd. for $C_{21}H_{24}ONCl$: Cl, 10.39. Found, Cl, 10.42.

*Example 2*

1-(5'-dimethylaminopentyl)-3,3-diphenyl-2-pyrrolidone

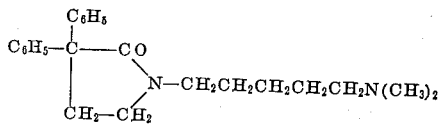

A solution of 20 g. of 1-(5'-chloropentyl)-3,3-diphenyl-2-pyrrolidone (Example 1) and 45 g. of dimethylamine in 130 ml. of benzene was heated in a bomb at 100° C. for ten hours with shaking. The contents of the bomb were then concentrated by distilling off part of the benzene and excess dimethylamine and the residue was extracted with dilute hydrochloric acid. The extracts were decolorized with charcoal and the basic product liberated by addition of 35% sodium hydroxide. This was extracted with ether, the ether extracts were washed with water and dried over anhydrous potassium carbonate. After removal of the ether the product was distilled, giving 14 g. (70%) of 1-(5'-dimethylaminopentyl)-3,3-diphenyl-2-pyrrolidone, B. P. 197–198° C. (0.2 mm.); $n_D^{25}=1.5591$.

The hydrochloride was prepared by dissolving a sample of the free base in anhydrous ether saturated with anhydrous hydrogen chloride gas. The acid addition salt separated, was filtered and recrystallized first from isopropyl alcohol and then from benzene; M. P. 105–106° C.

Anal.—Calcd. for $C_{23}H_{31}ON_2Cl$: C, 71.39; H, 8.08; Cl, 9.16. Found: C, 71.61; H, 8.01; Cl, 8.93.

Example 3

1-(5'-diethylaminopentyl)-3,3-diphenyl-2-pyrrolidone was prepared by the method described in Example 2, using diethylamine instead of dimethylamine. The product was obtained in about 60% yield, B. P. 190–196° C. (0.3 micron); $n_D^{25}=1.5504$.

Example 4

(a) *2,2-diphenyl-4-(N-pyrrolidyl)-butanenitrile.*—A suspension of 15 g. of sodium amide in 200 ml. of dry benzene contained in a two liter, three-necked flask equipped with thermometer, dropping funnel and reflux condenser was warmed to 40° C., and 57.9 g. of diphenylacetonitrile dissolved in dry benzene was added in a dropwise manner with stirring. The mixture was then cooled to 10° C. and 43.5 g. of beta-(N-pyrrolidyl)-ethyl chloride was added dropwise with stirring. This was refluxed for one-half hour, cooled to 10° C. and 300 ml. of water was slowly added to decompose excess sodium amide. The benzene layer was separated and the aqueous layer extracted with benzene. The combined benzene extracts were washed with 300 ml. of 3 N. hydrochloric acid, which was then made alkaline with 35% sodium hydroxide solution. The product which had oiled out was extracted with benzene, and the benzene solution was washed with water and dried over anhydrous calcium sulfate. After removal of the benzene, the product was distilled at reduced pressure through a 12" vacuum jacketed Vigreux column. The distillate crystallized and was recrystallized from petroleum ether (B. P. 60–70° C.) to give 71 g. (82%) of 2,2-diphenyl-4-(N-pyrrolidyl)-butanenitrile, M. P. 73.5–74.5° C.

Anal.—Amino nitrogen: Calcd., 4.85. Found, 4.85.

(b) 2,2-diphenyl-4-(N-pyrrolidyl)-butyric acid was prepared by hydrolysis of 2,2-diphenyl-4-(N-pyrrolidyl)-butanenitrile according to the method described in Example 1, part (a). The reaction mixture was heated for 65 hours. The acid melted at 204–205° C.

Anal.—Nitrogen: Calcd., 4.53. Found, 4.41.

(c) 1-(4'-chlorobutyl)-3,3-diphenyl-2-pyrrolidone was prepared according to the method of Example 1, part (b). A mixture of 27 g. of 2,2-diphenyl-4-(N-pyrrolidyl)-butyric acid and 40 ml. of thionyl chloride gave 18 g. (63%) of 1-(4'-chlorobutyl)-3,3-diphenyl-2-pyrrolidine, B. P. 200–210° C. (0.09 mm.); $n_D^{25}=1.5825$.

Anal.—Calcd. for $C_{20}H_{22}ONCl$: Cl, 10.82; N, 4.27. Found: Cl, 10.59; N, 4.21.

Example 5

1-(4'-dimethylaminobutyl)-3,3-diphenyl-2-pyrrolidone was prepared according to the method of Example 2. A mixture of 18 g. of 1-(4'-chlorobutyl)-3,3-diphenyl-2-pyrrolidone and 50 g. of dimethylamine in benzene gave 13 g. (70%) of 1-(4'-dimethylaminobutyl)-3,3-diphenyl-2-pyrrolidone, B. P. 200–201° C. (0.2 mm.);

$$n_D^{25}=1.5635$$

Anal.—Calcd. for $C_{22}H_{28}ON_2$: C, 78.51; H, 8.39; N(amino), 4.16. Found: C, 78.38; H, 8.50; N(amino), 4.18.

The hydrochloride was recrystallized from benzene and had the M. P. 160–161.5° C.

Example 6

(a) 2,2-diphenyl-4-(N-morpholinyl)-butanenitrile

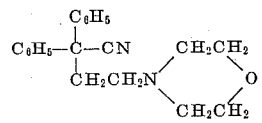

was prepared by a method similar to that described in Example 4, part (a). The reaction of 120.8 g. of diphenylacetonitrile and 98 g. of beta-(N-morpholinyl)-ethyl chloride in the presence of 30 g. of sodium amide gave 155.5 g. (79%) of product boiling over the range 130–190° C. (0.16–0.54 mm.).

(b) 2,2-diphenyl-4-(N-morpholinyl)-butonoic acid was prepared by hydrolysis of the crude 2,2-diphenyl-4-(N-morpholinyl)-butanenitrile of part (a) by the general method described in Example 1, part (a). The reaction mixture was heated for 70 hours. The pure acid was obtained in 57% yield and had the M. P. 216–217° C.

Anal.—Nitrogen: Calcd., 4.30. Found, 4.23.

(c) 1-[2'-(chloroethoxy)-ethyl]-3,3-diphenyl-2-pyrrolidone was prepared by a method similar to that described in Example 1, part (b). The reaction of 25.2 g. of 2,2-diphenyl-4-(N-morpholinyl)-butanoic acid and 35 ml. of thionyl chloride gave a 52% yield of 1-[2'-chloroethoxy)-ethyl]-3,3-diphenyl-2-pyrrolidone having the formula

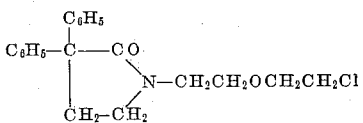

The fraction boiling above 184° C. (0.004 mm.) readily crystallized upon cooling. When recrystallized from alcohol it had the M. P. 70–78° C.

Anal.—Calcd. for $C_{20}H_{22}O_2NCl$: C, 69.85; H, 6.45; Cl, 10.31. Found: C, 69.85; H, 6.17; Cl, 10.10.

Example 7

1-[2'-(dimethylaminoethoxy)-ethyl]-3,3-diphenyl-2-pyrrolidone was prepared by the general method of Example 2. The reaction of 14 g. of 1-[2'-(chloroethoxy)-ethyl]-3,3-diphenyl-2-pyrrolidone and 45 ml. of dimethylamine gave 11.3 g. (78%) of 1-[2'-(dimethylaminoethoxy)-ethyl]-3,3-diphenyl-2-pyrrolidone, B. P. 175–183°

C. (0.1 mm.); $n_D^{25}=1.5626$ and having the formula

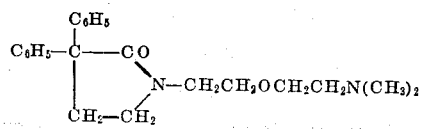

The hydrochloride was recrystallized from benzene and had the M. P. 125–127° C.

Anal.—Calcd. for $C_{22}H_{29}O_2N_2Cl$: C, 67.92; H, 7.25; Cl, 9.13. Found: C, 67.80; H, 7.50; Cl, 8.90.

The instant case is a division of our prior U. S. patent application Serial No. 71,042, filed January 14, 1949.

We claim:

1. The process of preparing a 2-pyrrolidone derivative of the formula

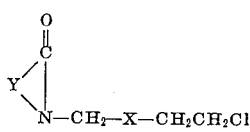

wherein Y is a divalent hydrocarbon radical in which a saturated chain of three carbon atoms intervenes between the carbonyl group and the nitrogen atom and X is a divalent bridge selected from the group consisting of —CH₂—, —CH₂CH₂—, and —CH₂O; which comprises reacting an acid of the formula

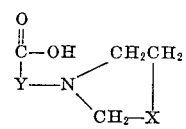

with the chloride of a strong acid, heating the tertiary-amino carboxylic acid chloride thus formed and isolating the resulting 2-pyrrolidone derivative.

2. The process of preparing a 2-pyrrolidone derivative of the formula

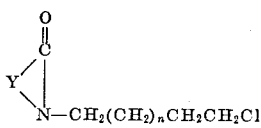

where Y is a divalent hydrocarbon radical in which a saturated chain of three carbon atoms intervenes between the carbonyl group and the nitrogen atom and $n$ is 1–2, which comprises reacting an acid of the formula

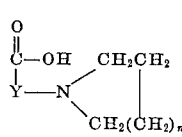

with the chloride of a strong acid, heating the tertiary-amino carboxylic acid chloride thus formed and isolating the resulting 2-pyrrolidone derivative.

3. The process of preparing a 2-pyrrolidone derivative of the formula

wherein Y is a divalent hydrocarbon radical in which a saturated chain of three carbon atoms intervenes between the carbonyl group and the nitrogen atom, which comprises reacting an acid of the formula

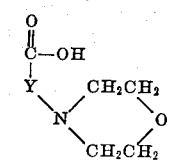

with the chloride of a strong acid, heating the tertiary-amino carboxylic acid chloride thus formed and isolating the resulting 2-pyrrolidone derivative.

4. The process of preparing a compound of the formula

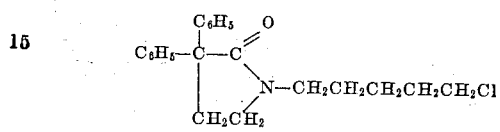

which comprises reacting a compound of the formula

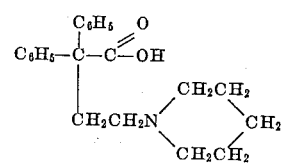

with the chloride of a strong acid, heating the tertiary-amino carboxylic acid chloride thus formed and isolating the resulting 2-pyrrolidone derivative.

5. The process of preparing a compound of the formula

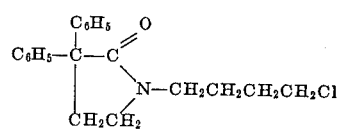

which comprises reacting a compound of the formula

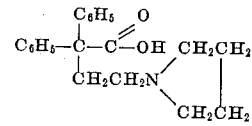

with the chloride of a strong acid, heating the tertiary-amino carboxylic acid chloride thus formed and isolating the resulting 2-pyrrolidone derivative.

6. The process of preparing a compound of the formula

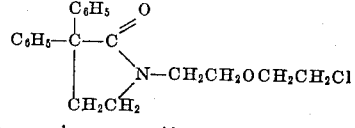

which comprises reacting a compound of the formula

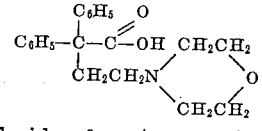

with the chloride of a strong acid, heating the tertiary-amino carboxylic acid chloride thus formed and isolating the resulting 2-pyrrolidone derivative.

7. A member of the group consisting of a compound having the formula

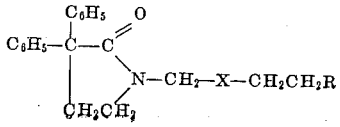

wherein X is a divalent bridge selected from the group consisting of —CH₂—, —CH₂CH₂— and —CH₂O—; and R is a member of the group consisting of chlorine and tertiary-amino, and salts thereof.

8. A compound having the formula

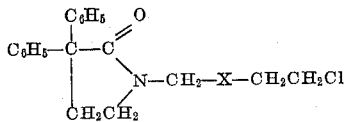

wherein X is a divalent bridge selected from the group consisting of —CH₂—, —CH₂CH₂— and —CH₂O—.

9. 1 - (5'-Chloropentyl) -3,3-diphenyl-2-pyrrolidone having the formula

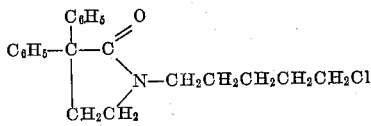

10. 1 - [2' - (Chloroethoxy) - ethyl] - 3,3 - diphenyl-2-pyrrolidone having the formula

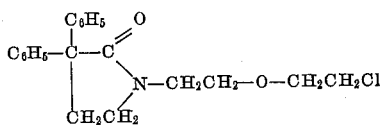

11. A member of the group consisting of a compound having the formula

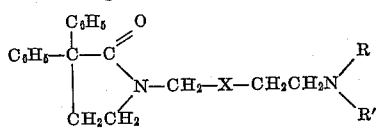

wherein X is a divalent bridge selected from the group consisting of —CH₂—, —CH₂CH₂— and —CH₂O—; and R and R' are lower alkyl groups; and salts thereof.

12. A member of the group consisting of a compound having the formula

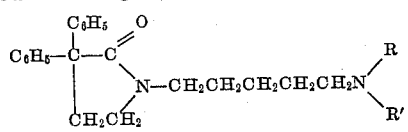

wherein R and R' are lower alkyl groups; and salts thereof.

13. A member of the group consisting of a compound having the formula

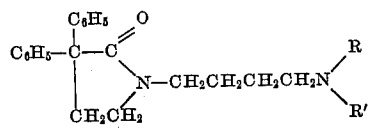

wherein R and R' are lower alkyl groups; and salts thereof.

14. A member of the group consisting of a compound having the formula

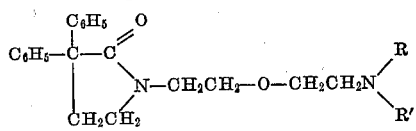

wherein R and R' are lower alkyl groups; and salts thereof.

15. A member of the group consisting of 1-(5'-dimethylaminopentyl) - 3,3 - diphenyl-2-pyrrolidone having the formula

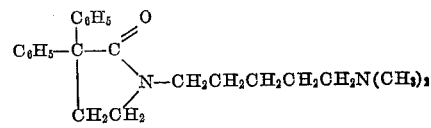

and salts thereof.

16. A member of the group consisting of 1-(4'-dimethylaminobutyl) -3,3-diphenyl-2-pyrrolidone having the formula

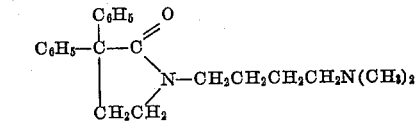

and salts thereof.

17. A member of the group consisting of 1-[2'-(dimethylaminoethoxy) - ethyl]-3,3-diphenyl-2-pyrrolidone having the formula

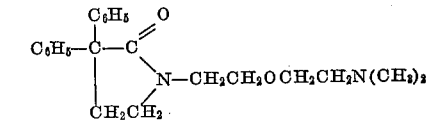

and salts thereof.

18. The process according to claim 1, wherein the chloride of the strong acid is a member of the group consisting of thionyl chloride and phosphorus trichloride.

PHILIP LUCAS.
ROBERT L. CLARKE.
ARAM MOORADIAN.

REFERENCES CITED

The following references are of record in the file of this patent:

UNITED STATES PATENTS

| Number | Name | Date |
|---|---|---|
| 2,421,729 | Walton et al. | June 3, 1947 |

FOREIGN PATENTS

| Number | Country | Date |
|---|---|---|
| 501,135 | Great Britain | Feb. 21, 1939 |